United States Patent Office 3,231,625
Patented Jan. 25, 1966

3,231,625
PREPARATION OF FLUOROCHLOROBENZENES
Frank Nyman, Northwich, England, assignor to Imperial Chemical Industries Limited, London, England, a corporation of Great Britain
No Drawing. Filed Aug. 16, 1963, Ser. No. 302,727
Claims priority, application Great Britain, Sept. 19, 1962, 35,673/62
2 Claims. (Cl. 260—650)

This invention relates to a process for making fluorochlorobenzenes, particularly the more fluorinated fluorochlorobenzenes, by thermal disproportionation of less fluorinated fluorochlorobenzenes.

In application No. 282,597, filed May 23, 1963, there is described a process for making fluorochlorobenzenes by reacting hexachlorobenzene with an alkali metal fluoride at temperatures above 100° C. and in a suitable solvent medium for example tetramethylene sulphone. This process provides a convenient method for making tetrafluorodichlorobenzene and trifluorotrichlorobenzene, but gives lower yields of pentafluorochlorobenzene and hexafluorobenzene.

I have now found that both tetrafluorodichlorobenzene and trifluorotrichlorobenzene disproportionate at elevated temperatures to give mixtures of fluorochlorobenzenes that include pentafluorochlorobenzene and hexafluorobenzene.

According to my invention I provide a process for making fluorochlorobenzenes by thermal disproportionation of one fluorochlorobenzene to give a mixture of other fluorochlorobenzenes comprising heating at a temperature above 600° C. a fluorochlorobenzene chosen from the group consisting of trifluorotrichlorobenzene and tetrafluorodichlorobenzene, and separating the fluorochlorobenzenes formed.

Below about 600° C. little or no disproportionation occurs; the useful upper temperature limit is over 900° C., but a convenient range is 700°–850° C.

The reaction is catalysed by aluminium trifluoride, a convenient method for making which is to heat powdered ammonium aluminium fluoride in a stream of nitrogen gradually up to 800° C., whereupon ammonium fluoride splits off from the double fluoride and is carried away in the nitrogen stream. The aluminium fluoride may be dispersed on magnesium fluoride and then appears to have a slightly greater catalytic effect. Caesium fluoride has a moderate catalytic effect, but chromium fluoride and boron fluoride have no significant effects.

The disproportionation reaction is conveniently carried out by passing the starting fluorochlorobenzene in a stream of dry nitrogen along a heated tube made of or lined with a material that can resist attack by fluorine and chlorine, for example platinum, nickel, carbon. The issuing product can be condensed in traps cooled with liquid air, and subsequently separated by, for example, gas-chromatography.

Tetrafluorodichlorobenzene, trifluorotrichlorobenzene and difluorotetrachlorobenzene each has three possible isomers. Gas-chromatographic analysis cannot distinguish between the three isomers of any one compound; thus isomerisation as well as disproportionation may be taking place. For example, when sym.-trifluorotrichlorobenzene undergoes the heating process the un-disproportionated trifluorotrichlorobenezene recovered may consist of a mixture of the three isomers. It is believed however that in the products the symmetrical isomer of $C_6F_3Cl_3$ predominates, and that the tetrafluorodichlorobenzene is mainly 1,3-dichlorotetrafluorobenzene and that the difluorotetrachlorobenzene is mainly 1,3,4,5-tetrachlorodifluorobenzene.

The invention is illustrated by a series of experiments whose results are summarised in Tables I and II following.

In each experiment between 10.0 and 10.5 g. of the starting fluorochlorobenzene was passed in a stream of dry nitrogen through a platinum-lined "Inconel" ("Inconel" is a registered trademark) tube 3 feet long and ½ inch internal diameter heated to the desired reaction temperature. The rate of addition of the fluorochlorobenzene was such that the total addition took place over 30 minutes; flow-rates of the nitrogen were from 10 to 50 mls. per minute. The products issuing from the tube were collected in a trap cooled with liquid air and subsequently separated by gas-chromatography using a silicone grease supported on firebrick. In the tables the right-hand column headed "recovery" shows the combined weights of all fluorochlorobenzenes, both starting materials and those formed by the disproportionation found in the products, and expressed as a percentage of the weight of starting material. The high values, generally over 90%, of the recovery indicate the great thermal stability of these various compounds. In the tables the abbreviation "tr." signifies a trace of the compound.

TABLE I

*Disproportionation of sym.-trifluorochlorobenzene*

| Temp. (° C.) | $N_2$ Flow Rate (mls./min.) | Catalyst | Composition of Products (mole percent) | | | | | | Recovery (percent) |
|---|---|---|---|---|---|---|---|---|---|
| | | | $C_6F_6$ | $C_6F_5Cl$ | $C_6F_4Cl_2$ | $C_6F_3Cl_3$ | $C_6F_2Cl_4$ | $C_6FCl_5$ | |
| 600 | 20 | $AlF_3$ | | | | 100 | | | 95 |
| 610 | 10 | $AlF_3$ | | | | 100 | | | 70 |
| 630 | 10 | $AlF_3$ | | tr. | tr. | >90 | tr. | | 95 |
| 700 | 10 | $AlF_3$ | | 1.3 | 15.1 | 62.3 | 20.2 | 1.1 | 96 |
| 750 | 15 | $AlF_3$ | | 24.1 | 14.2 | 33.7 | 21.6 | 7.0 | 93 |
| 750 | 25 | $CrF_3$ | | tr. | 9.5 | 63.8 | 26.7 | | 95 |
| 750 | 25 | None | | tr. | 7.0 | 79.6 | 13.6 | tr. | 96 |
| 750 | 25 | $BF_3$ | | | 3.1 | 96.4 | 0.5 | | 81 |
| 800 | 50 | None | | 1.6 | 14.7 | 56.3 | 27.4 | | 94 |
| 800 | 50 | $AlF_3$ | | 2.0 | 16.1 | 56.2 | 20.9 | 4.8 | 83 |
| 850 | 50 | None | | 1.5 | 12.5 | 61.7 | 19.6 | 4.7 | 94 |
| 850 | 10 | $AlF_3/MgF_2$ | 0.03 | 1.0 | 10.7 | 73.5 | 14.8 | | 92 |

TABLE II
*Disproportionation of tetrafluorodichlorobenzene*

| Temp. (°C.) | N₂ Flow Rate (mls./min.) | Catalyst | Composition of Products (mole percent) | | | | | | Recovery (percent) |
|---|---|---|---|---|---|---|---|---|---|
| | | | $C_6F_6$ | $C_6F_5Cl$ | $C_6F_4Cl_2$ | $C_6F_3Cl_3$ | $C_6F_2Cl_4$ | $C_6FCl_5$ | |
| 610 | 5 | AlF₃ | | | 95 | tr. | | | 74 |
| 750 | 10 | AlF₃ | 2.5 | 19.5 | 44.2 | 28.1 | 4.7 | 1.0 | 71 |
| 750 | 25 | CrF₃ | tr. | 10.0 | 58.7 | 22.6 | 8.7 | tr. | 96 |
| 750 | 25 | None | 1.7 | 15.8 | 49.5 | 28.2 | 4.8 | | 94 |
| 750 | 25 | BF₃ | | 6.9 | 64.4 | 28.7 | | | 97 |
| 750 | 25 | AlF₃ | 0.9 | 14.2 | 61.4 | 20.9 | 2.6 | | 93 |
| 750 | 25 | CsF | 1.4 | 18.3 | 51.3 | 23.6 | 3.4 | | 97 |
| 800 | 5 | None | 0.8 | 13.6 | 33.2 | 36.2 | 16.2 | | 89 |
| 825 | 50 | ----do---- | 1.8 | 12.6 | 32.9 | 36.7 | 15.9 | | 91 |
| 850 | 50 | ----do---- | 0.7 | 8.4 | 30.6 | 39.8 | 20.6 | | 49 |
| 700 | 25 | AlF₃/MgF₂ | 0.9 | 10.3 | 69.6 | 17.6 | 1.5 | | 92 |
| 800 | 25 | AlF₃/MgF₂ | 2.3 | 18.3 | 37.0 | 32.8 | 9.7 | | 92 |

What we claim is:
1. A process for making fluorochlorobenzenes by thermal disproportionation of one fluorochlorobenzene to give a mixture of other fluorochlorobenzenes comprising heating at a temperature above 600° C. up to about 900° C. a fluorochlorobenzene chosen from the group consisting of trifluorotrichlorobenzene and tetrafluorodichlorobenzene, and separating the fluorochlorobenzenes formed.

2. A process as claimed in claim 1 in which the reaction temperature is from 700° C. to 850° C. and the fluorochlorobenzene is heated in contact with a catalyst chosen from the group consisting of aluminium fluoride, aluminium fluoride dispersed on magnesium fluoride, and caesium fluoride.

References Cited by the Examiner
UNITED STATES PATENTS

| | | | |
|---|---|---|---|
| 2,674,630 | 4/1954 | Calfee et al. | 260—653 |
| 2,920,111 | 1/1960 | Braid et al. | 260—653 |
| 3,087,974 | 4/1963 | Hauptschein | 260—653 |

LEON ZITVER, *Primary Examiner.*